US009749159B2

(12) United States Patent
Whitby-Strevens

(10) Patent No.: US 9,749,159 B2
(45) Date of Patent: *Aug. 29, 2017

(54) METHODS AND APPARATUS FOR SCRAMBLING SYMBOLS OVER MULTI-LANE SERIAL INTERFACES

(71) Applicant: APPLE INC., Cupertino, CA (US)

(72) Inventor: Colin Whitby-Strevens, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/961,501

(22) Filed: Dec. 7, 2015

(65) Prior Publication Data

US 2016/0164705 A1 Jun. 9, 2016

Related U.S. Application Data

(63) Continuation of application No. 13/841,897, filed on Mar. 15, 2013, now Pat. No. 9,210,010.

(51) Int. Cl.
H04L 25/03 (2006.01)
G09G 5/00 (2006.01)
G06F 3/14 (2006.01)
G09G 5/12 (2006.01)

(52) U.S. Cl.
CPC ........ H04L 25/03866 (2013.01); G09G 5/006 (2013.01); G06F 3/14 (2013.01); G09G 5/12 (2013.01); G09G 2330/06 (2013.01); G09G 2370/12 (2013.01); H04L 25/03872 (2013.01)

(58) Field of Classification Search
CPC ...... G09G 2330/06; G09G 5/006; G09G 5/12; G09G 2370/12; H04L 25/03866; H04L 25/03872; G06F 3/14
See application file for complete search history.

(56) References Cited

U.S. PATENT DOCUMENTS

| 3,902,117 A | 8/1975 | Sheppard |
| 4,523,181 A | 6/1985 | Tazaki et al. |
| 4,791,407 A | 12/1988 | Prucnal et al. |

(Continued)

FOREIGN PATENT DOCUMENTS

| CN | 101573873 A | 11/2009 |
| CN | 102290024 A | 12/2011 |

(Continued)

OTHER PUBLICATIONS

Ajanovic J. "PCI Express 3.0 Overview", HotChips—Aug. 23, 2009, pp. 1-61.*

(Continued)

Primary Examiner — Sophia Vlahos
(74) Attorney, Agent, or Firm — Gazdzinski & Associates, PC

(57) ABSTRACT

Methods and apparatus for scrambling symbols over multi-lane serial interfaces in order to improve undesired electromagnetic emissions. In one embodiment the scrambling is based on a seed value associated with each lane. In a second embodiment, the scrambling values are selected from various taps of a scrambling component, where the selection is based on the associated lane. In still a third embodiment, each lane is associated with a distinct scrambling component.

19 Claims, 8 Drawing Sheets

(56) References Cited

U.S. PATENT DOCUMENTS

| | | |
|---|---|---|
| 5,224,096 A | 6/1993 | Onishi et al. |
| 5,461,426 A | 10/1995 | Limberg et al. |
| 5,961,608 A | 10/1999 | Onosaka et al. |
| 5,961,680 A | 10/1999 | Wooldridge |
| 6,078,532 A | 6/2000 | Rivers et al. |
| 6,222,891 B1 | 4/2001 | Liu et al. |
| 6,381,332 B1 | 4/2002 | Glaab |
| 6,426,780 B1 | 7/2002 | Limberg et al. |
| 6,516,437 B1 | 2/2003 | Van Stralen et al. |
| 6,574,731 B1 | 6/2003 | Coles et al. |
| 6,597,743 B1 | 7/2003 | Khayrallah et al. |
| 6,618,395 B1 | 9/2003 | Kimmitt |
| 6,654,926 B1 | 11/2003 | Raphaeli et al. |
| 6,775,334 B1 | 8/2004 | Liu et al. |
| 6,870,930 B1 | 3/2005 | Kim et al. |
| 7,062,587 B2 | 6/2006 | Zaidi et al. |
| 7,062,687 B2 | 6/2006 | Gfeller et al. |
| 7,062,689 B2 | 6/2006 | Slobodnik |
| 7,257,163 B2 | 8/2007 | Hwang et al. |
| 7,359,437 B2 | 4/2008 | Hwang et al. |
| 7,365,575 B2 | 4/2008 | Kim |
| 7,394,406 B2 | 7/2008 | Pasqualino |
| 7,403,486 B2 | 7/2008 | Flask |
| 7,460,031 B2 | 12/2008 | Yeo et al. |
| 7,561,074 B2 | 7/2009 | Pasqualino |
| 7,573,596 B2 | 8/2009 | Owen |
| 7,639,687 B1 | 12/2009 | Tsai et al. |
| 7,672,285 B2 | 3/2010 | Sun et al. |
| 7,773,752 B2 | 8/2010 | Noh et al. |
| 7,961,880 B2 | 6/2011 | Wang et al. |
| 8,000,404 B2 | 8/2011 | Talbot et al. |
| 8,139,660 B2 | 3/2012 | Anigstein et al. |
| 8,253,605 B2 | 8/2012 | Rivoir |
| 8,325,699 B2 | 12/2012 | Sun et al. |
| 8,432,791 B1 | 4/2013 | Masters |
| 8,588,287 B2 | 11/2013 | Chen et al. |
| 8,644,504 B2 | 2/2014 | Choi |
| 8,650,010 B2 | 2/2014 | M et al. |
| 8,678,860 B2 | 3/2014 | Minich et al. |
| 8,733,650 B1 | 5/2014 | Segal et al. |
| 8,737,625 B2 | 5/2014 | Ikeda et al. |
| 8,750,176 B2 | 6/2014 | Whitby-Strevens |
| 8,838,822 B2 | 9/2014 | Spalla et al. |
| 8,917,194 B2 | 12/2014 | Whitby-Strevens |
| 8,949,493 B1 | 2/2015 | Wortman et al. |
| 9,166,623 B1 | 10/2015 | Bates et al. |
| 9,210,010 B2 * | 12/2015 | Whitby-Strevens ......................... H04L 25/03866 |
| 9,484,954 B1 | 11/2016 | Gopal et al. |
| 2001/0022813 A1 | 9/2001 | Tan et al. |
| 2002/0051562 A1 | 5/2002 | Sheppard et al. |
| 2002/0138721 A1 | 9/2002 | Kwon et al. |
| 2002/0159553 A1 | 10/2002 | McCarty et al. |
| 2003/0005436 A1 | 1/2003 | Naganuma |
| 2003/0043141 A1 | 3/2003 | Bae et al. |
| 2003/0048851 A1 | 3/2003 | Hwang et al. |
| 2003/0048852 A1 | 3/2003 | Hwang et al. |
| 2003/0165182 A1 | 9/2003 | O'Farrell |
| 2003/0168512 A1 | 9/2003 | Longacre et al. |
| 2003/0214507 A1 | 11/2003 | Mawatari et al. |
| 2004/0002312 A1 | 1/2004 | Li et al. |
| 2004/0071158 A1 | 4/2004 | Wei |
| 2004/0071221 A1 | 4/2004 | Nakada et al. |
| 2004/0088633 A1 | 5/2004 | Lida et al. |
| 2004/0103363 A1 | 5/2004 | Kim et al. |
| 2004/0131025 A1 | 7/2004 | Dohler et al. |
| 2005/0012592 A1 | 1/2005 | Debelleix |
| 2005/0175122 A1 | 8/2005 | Nefedov et al. |
| 2005/0185796 A1 | 8/2005 | Lablans |
| 2005/0286643 A1 | 12/2005 | Ozawa et al. |
| 2006/0062467 A1 | 3/2006 | Zou et al. |
| 2006/0095613 A1 | 5/2006 | Venkata et al. |
| 2006/0117125 A1 | 6/2006 | Tseng |
| 2006/0176941 A1 | 8/2006 | Nieto et al. |
| 2006/0176983 A1 | 8/2006 | Wadsworth et al. |
| 2006/0190589 A1 | 8/2006 | Parker et al. |
| 2006/0203900 A1 | 9/2006 | Koralek et al. |
| 2006/0250628 A1 | 11/2006 | Owen |
| 2007/0016778 A1 | 1/2007 | Lyle |
| 2007/0016779 A1 | 1/2007 | Lyle |
| 2007/0074242 A1 | 3/2007 | Wang et al. |
| 2007/0107034 A1 | 5/2007 | Gotwals |
| 2007/0116055 A1 | 5/2007 | Atsumi et al. |
| 2007/0139232 A1 | 6/2007 | Venkata et al. |
| 2007/0153930 A1 | 7/2007 | Reid |
| 2007/0192664 A1 | 8/2007 | Ogawa et al. |
| 2007/0204204 A1 | 8/2007 | Sul et al. |
| 2007/0206638 A1 | 9/2007 | Santoru et al. |
| 2007/0206642 A1 | 9/2007 | Egan et al. |
| 2007/0220279 A1 | 9/2007 | Northcutt et al. |
| 2007/0230687 A1 | 10/2007 | Talbot et al. |
| 2007/0237332 A1 | 10/2007 | Lyle |
| 2007/0242764 A1 | 10/2007 | Anigstein et al. |
| 2007/0257923 A1 | 11/2007 | Whitby-Strevens |
| 2008/0024334 A1 | 1/2008 | Grivna |
| 2008/0046728 A1 | 2/2008 | Lyle |
| 2008/0095218 A1 | 4/2008 | Murray et al. |
| 2008/0123764 A1 | 5/2008 | McNamara et al. |
| 2008/0178062 A1 | 7/2008 | Norris et al. |
| 2008/0178063 A1 | 7/2008 | Norris et al. |
| 2008/0180287 A1 | 7/2008 | Widmer |
| 2008/0186545 A1 | 8/2008 | Meier et al. |
| 2008/0204285 A1 | 8/2008 | Carter et al. |
| 2008/0215934 A1 | 9/2008 | Liu |
| 2008/0235551 A1 | 9/2008 | Lin |
| 2008/0252497 A1 | 10/2008 | Widmer |
| 2008/0258945 A1 | 10/2008 | Widmer |
| 2008/0263621 A1 | 10/2008 | Austerlitz et al. |
| 2008/0273602 A1 | 11/2008 | Glen et al. |
| 2008/0304596 A1 | 12/2008 | Tan et al. |
| 2009/0010318 A1 | 1/2009 | Belogolovyi et al. |
| 2009/0024756 A1 | 1/2009 | Spalla et al. |
| 2009/0100179 A1 * | 4/2009 | Song ......................... G06F 15/16 709/226 |
| 2009/0147864 A1 | 6/2009 | Lida et al. |
| 2009/0185565 A1 | 7/2009 | Diab et al. |
| 2009/0195506 A1 | 8/2009 | Geidl et al. |
| 2010/0057556 A1 | 3/2010 | Rousso et al. |
| 2010/0067693 A1 | 3/2010 | Courington et al. |
| 2010/0074350 A1 | 3/2010 | Malladi et al. |
| 2010/0111100 A1 * | 5/2010 | Baumer ............... G09G 3/2096 370/465 |
| 2010/0118795 A1 | 5/2010 | Hassan |
| 2010/0128816 A1 | 5/2010 | Sun et al. |
| 2010/0238951 A1 | 9/2010 | Ozawa |
| 2010/0262893 A1 | 10/2010 | Carter et al. |
| 2010/0322340 A1 | 12/2010 | Bohm |
| 2011/0026414 A1 | 2/2011 | Banerjee |
| 2011/0122142 A1 | 5/2011 | Wyatt et al. |
| 2011/0145676 A1 | 6/2011 | Nicholson |
| 2011/0188613 A1 | 8/2011 | Dowling et al. |
| 2011/0208954 A1 | 8/2011 | Barrett et al. |
| 2011/0246840 A1 | 10/2011 | Khoshnevis et al. |
| 2011/0310296 A1 | 12/2011 | Lee et al. |
| 2011/0320905 A1 | 12/2011 | Lin et al. |
| 2012/0084559 A1 | 4/2012 | Bonicatto |
| 2012/0087973 A1 | 4/2012 | Lieberman et al. |
| 2012/0139593 A1 | 6/2012 | Saito et al. |
| 2012/0146989 A1 | 6/2012 | Whitby-Strevens |
| 2012/0147274 A1 | 6/2012 | Hassan et al. |
| 2012/0163490 A1 | 6/2012 | Whitby-Strevens |
| 2012/0188951 A1 | 7/2012 | He et al. |
| 2013/0195160 A1 | 8/2013 | Whitby-Strevens |
| 2013/0195218 A1 | 8/2013 | Whitby-Strevens |
| 2014/0321575 A1 | 10/2014 | Asakura et al. |
| 2014/0344650 A1 | 11/2014 | Au |
| 2015/0156186 A1 | 6/2015 | Jeffrey |
| 2015/0188576 A1 | 7/2015 | Lim et al. |
| 2015/0215312 A1 | 7/2015 | Cesnik |
| 2015/0244394 A1 | 8/2015 | Wang et al. |
| 2015/0256522 A1 | 9/2015 | Jeffrey |
| 2016/0127053 A1 | 5/2016 | Ganter |

(56) References Cited

U.S. PATENT DOCUMENTS

FOREIGN PATENT DOCUMENTS

| EP | 1517295 A2 | 3/2005 |
|---|---|---|
| EP | 1940034 A1 | 7/2008 |
| EP | 2490473 A1 | 8/2012 |
| KR | 20070092676 A | 9/2007 |
| WO | WO-03058826 A2 | 7/2003 |
| WO | WO-2011044793 A1 | 4/2011 |
| WO | WO-2012087973 A1 | 6/2012 |
| WO | WO-2013112930 A2 | 8/2013 |

OTHER PUBLICATIONS

Display Port Standard Version 1.1 (Mar. 19, 2007) (VESA, www.vesa.org).
IEEE Standard for a High-Performance Serial Bus, IEEE Computer Society, Oct. 21, 2008.
Nxp: "Technical Analysis of the JEDEC JESD204A Data Converter Interface", Jun. 1, 2009 (Jun. 1, 2009), XP055070699, Retrieved from Internet: URL:http://www.nxp.com/wcmadocuments/newsklownload-media/publications/technical_whitepaper final.pdf [retrieved on Jul. 10, 2013] section 3.2 last but one par. p. 12 2nd par. p. 3; figure 4.
Stein, Digital Signal Processing, a Computer Science Perspective, 2000, John Wiley & Sons Inc., pp. 712-713.
Video Electronics Standards Association: "Displayport Standard Version 1.1", Mar. 19, 2007, pp. 1-228.
Widmer, A. X., Franaszek, PA., "A DC/Balanced, Partitioned/Block, 8B/10B Transmission Code", IBM I_Res. Develop, vol. 27, No. 5, Sep. 1983, pp. 440/451.

* cited by examiner

METHODS AND APPARATUS FOR SCRAMBLING SYMBOLS OVER MULTI-LANE SERIAL INTERFACES

PRIORITY AND RELATED APPLICATIONS

This application is a continuation of and claims priority to co-owned and co-pending U.S. patent application Ser. No. 13/841,897 of the same title, filed Mar. 15, 2013, which is incorporated herein by reference in its entirety.

This application is also related to co-owned, co-pending U.S. patent application Ser. No. 13/747,264 filed on Jan. 22, 2013 and entitled "METHODS AND APPARATUS FOR THE INTELLIGENT SCRAMBLING OF CONTROL SYMBOLS"; Ser. No. 13/747,383 filed Jan. 22, 2013 and entitled "METHODS AND APPARATUS FOR ERROR RATE ESTIMATION"; and Ser. No. 12/976,274 filed Dec. 22, 2010 and entitled "Methods and Apparatus for the Intelligent Association of Control Symbols", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data networking and telecommunications. More particularly, in one exemplary aspect, the present disclosure is directed to scrambling symbols over multi-lane serial interfaces in order to improve undesired electromagnetic emissions.

2. Description of Related Technology

Many serial communications systems send data over more than one lane or channel. Commercial examples include without limitation, DisplayPort, HDMI (High-Definition Multimedia Interface), etc.

As is well known within the electrical arts, rapid signaling changes in a transmission line will generate undesirable electromagnetic interference (EMI) in neighboring circuitry and/or devices. Consequently, in order to reduce EMI, certain technologies (such as for example and without limitation, DisplayPort, Firewire, etc.) utilize a transmitter "scrambler" that is configured to add/spread the signal with pseudorandom noise; the resulting "scrambled" signal has a reduction in peak spectral noise, and a wider spectral "footprint". The receiver has a corresponding "descrambler" which can remove the pseudorandom noise and reconstruct the original signal. Many types of pseudorandom number generators exist; however, scramblers are typically implemented with linear feedback shift registers (LFSRs) due to the simplicity and relatively inexpensive cost.

One problem with multi-channel scrambling technologies (such as DisplayPort, etc.) occurs when the same data is transmitted on each channel. For example, during video data transmissions so-called "blanking" intervals can include long periods of null data which are typically represented with the same value (e.g., all zeros (0) or all ones (1)). Under these circumstances, the scrambled result for each lane of the multi-lane transceiver is identical (each lane transmits the same value, which is identically scrambled). Since each lane is perfectly correlated with the other lanes, the overall EMI magnitude of the multi-lane transmission is a direct sum of each of the contributing EMIs. The resulting spectral footprint of the multi-lane transmission line may be strong enough to interrupt nearby circuitry. Large EMI can be especially problematic for devices that have very aggressive form factors (i.e., where components are in very close proximity).

Accordingly, improved apparatus and methods are needed in order to address these EMI concerns with regards to multi-lane serial bus technologies such as e.g., DisplayPort, etc. More generally, such apparatus and methods would ideally provide for mechanisms that improve the EMI characteristics of multi-lane high speed serial bus operation, while also advantageously leveraging existing hardware in certain implementations so as to minimize circuitry costs in future implementations.

SUMMARY

The aforementioned needs are satisfied by providing, inter alia, improved apparatus and methods for scrambling symbols over multi-lane serial interfaces in order to improve undesired electromagnetic emissions.

A method for scrambling a plurality of symbols is disclosed. In one embodiment, the method includes: scrambling a plurality of symbols according to at least a corresponding plurality of scrambling values; transmitting the plurality of scrambled symbols via a corresponding plurality of lanes to a receiver; and where the receiver is configured to responsive to receiving the plurality of scrambled symbols, descramble the plurality of scrambled symbols.

In another embodiment, the method includes: responsive to receiving a plurality of scrambled symbols, descramble the plurality of scrambled symbols according to a corresponding plurality of scrambling values; where the plurality of scrambling values are associated within each lane of a multi-lane receiver.

A multi-lane transmitter is also disclosed. In one embodiment, the multi-lane transmitter is configured to scramble each lane according to a distinct scrambling value.

A multi-lane receiver is further disclosed. In one embodiment, the multi-lane receiver is configured to descramble each lane according to a distinct scrambling value.

A multi-lane communication system is additionally disclosed. In one embodiment, the multi-lane communication system is configured to scramble/descramble symbols over multi-lane serial interfaces in order to improve undesired electromagnetic emissions.

Other features and advantages will immediately be recognized by persons of ordinary skill in the art with reference to the attached drawings and detailed description of exemplary embodiments as given below.

All Figures© Copyright 2013 Apple Inc. All rights reserved.

DETAILED DESCRIPTION

Reference is now made to the drawings, wherein like numerals refer to like parts throughout.

Detailed Description of Exemplary Embodiments

Exemplary embodiments are now described in detail. While these embodiments are primarily discussed in the context of an HDMI and DisplayPort audio/visual (A/V) networks, it will be recognized by those of ordinary skill that the present disclosure is not in any way limited to such applications. In fact, the various aspects set forth herein are useful in any network that can benefit from the reduction of electromagnetic interference in multi-lane serial bus transactions.

Furthermore, while these embodiments are disclosed in a serial transmission of digital data represented as electrical levels, ones having ordinary skill in the related arts will recognize that the various techniques may also extend to other systems and applications including, inter alia, multi-level wired systems (e.g., three-level encoded Ethernet), and modulated transmission schemes (e.g., a high frequency carrier that is modulated in the amplitude or frequency domain {AM or FM} by the signals being transmitted).
Existing HDMI Operation—

Figure 1:
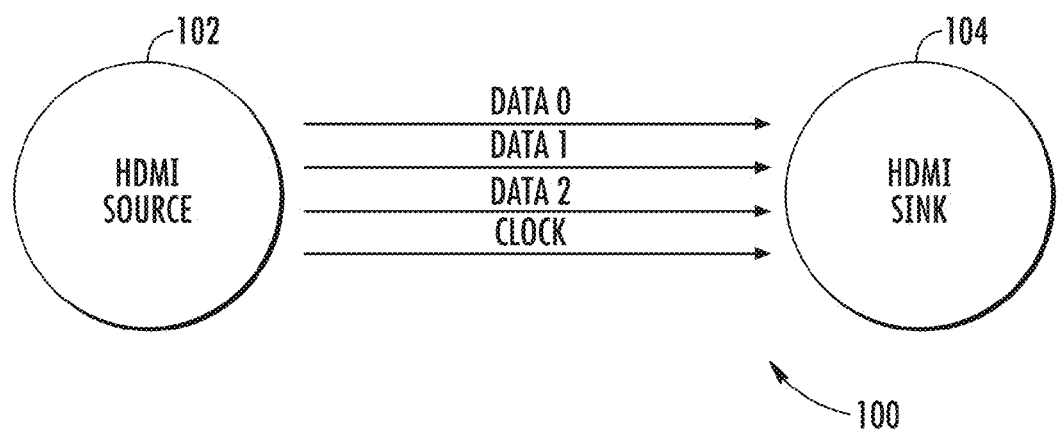
FIG. 1 is a graphical representation of one exemplary HDMI multimedia system that includes one or more multimedia sources and one or more multimedia sinks.

Referring now to FIG. 1, one exemplary HDMI multimedia system is illustrated. As shown the system 100 includes one or more multimedia sources 102, and one or more multimedia sinks 104. Common examples of multimedia sources include, without limitation, media players (e.g., Digital Video Disk (DVD) players, Blue-ray players, etc.), content delivery networks, audio/visual (A/V) equipment (e.g., camcorders, etc.), personal computers (PC), etc. Common examples of multimedia sinks include, without limitation, media displays, televisions, monitors, etc.

The exemplary HDMI interface comprises four (4) unidirectional differential signaling pairs that consist of: three (3) data channels (data channel 0, data channel 1, data channel 2), and a clock (characterized by a ⅒ bit-rate frequency). In other configurations (such as e.g., future implementations of HDMI, and Mobile High Definition Link (MHL)), the clock differential pair may be replaced with another data channel.

Figure 2:
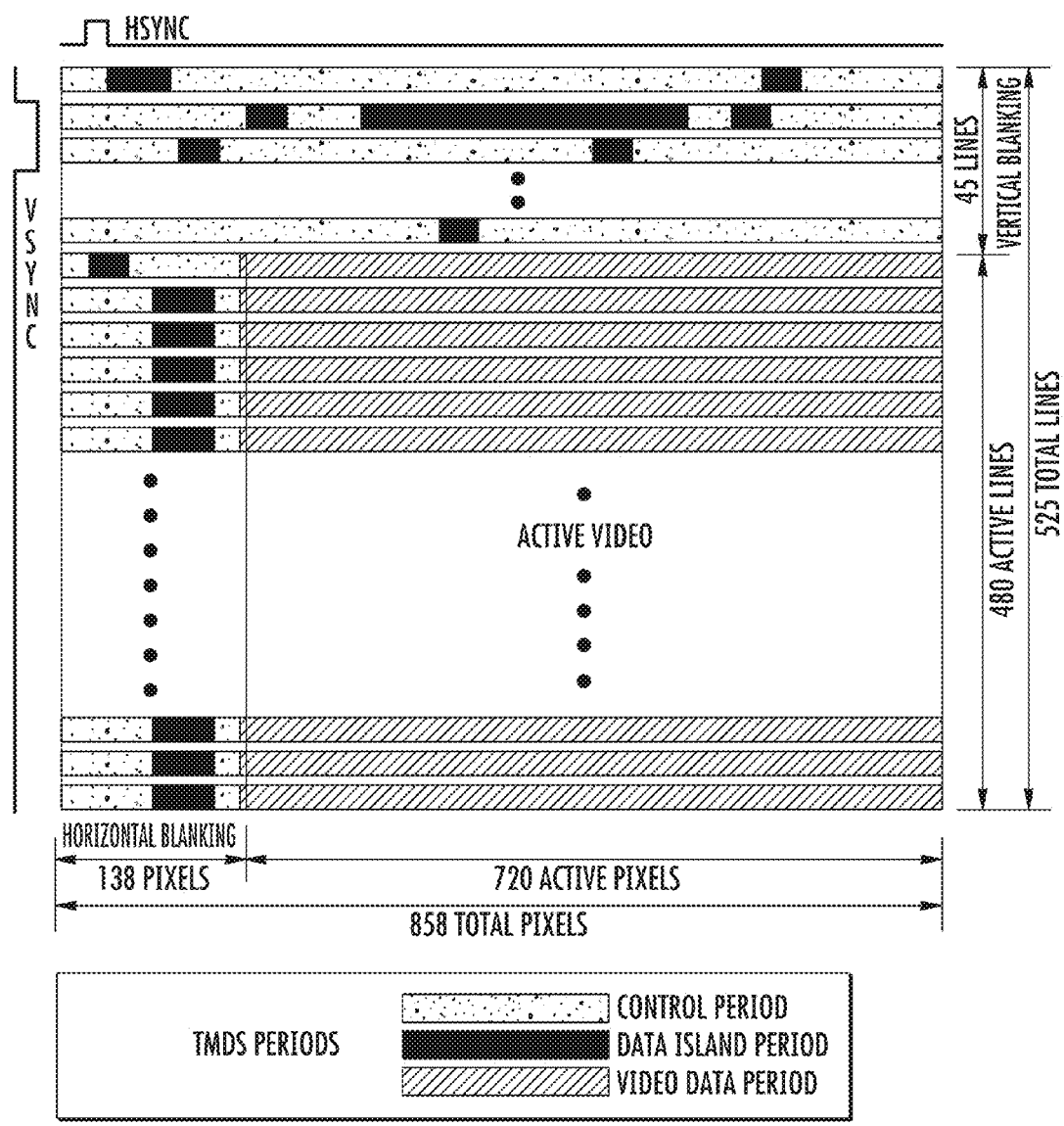
FIG. 2 is an exemplary prior art HDMI 720×480p video frame.

FIG. 2 is a graphical representation of exemplary data traffic representing a frame of 720×480 pixels of video data. It should be noted that the foregoing resolution is merely illustrative of a common video frame size, those of ordinary skill in the related arts will appreciate that other video frame sizes may be substituted. As a brief aside, the current incarnation of HDMI specifies five (5) different types of information: (i) control information, (ii) preamble, (iii) guard band, (iv) data island data and (v) video data. As shown in FIG. 2, the first 45 scan lines constitute the vertical blanking interval. Thereafter, the first 138 pixels of each scan line is a horizontal blanking interval, the remaining 720 pixels is video data. During both the horizontal and vertical blanking intervals, the data channels may transmit either control data or data islands. The preamble and guard band information are provided to facilitate identification of data islands and/or video data. A preamble immediately precedes data island periods and video data periods. Both video data periods and data island periods start with a guard band. Data island periods may also conclude with a guard band.

Prior art HDMI TMDS observes a fixed set of rules that enables only a subset of possible symbols, based on the type of data. Moreover, for simplicity, only 10-bit patterns are used to represent the information to be transmitted (i.e., the symbols do not change in length). Specifically, the 10-bit encodings used for control and preamble transmissions share common symbols which are disjoint from (i.e., do not overlap) the 10-bit symbols used for the other types of data (guard band, data island and video data). Similarly, the 10-bit symbol encodings used for data island transmissions (also referred to as TERC4 (TMDS Error Reduction Coding 4-bit) encoding) are distinct. The 10-bit symbols used for the guard band are a subset of the symbol encodings used for video data.

Existing HDMI implementations do not implement any form of scrambling over the individual channels. Incipient research is directed to incorporating scrambling functionality to improve future implementations of HDMI.
Existing DisplayPort Operation—

From an application software standpoint, DisplayPort is very similar to HDMI, in fact in some applications DisplayPort can be used to encapsulate HDMI data. However, the physical interface of DisplayPort is markedly different.

Figure 3:
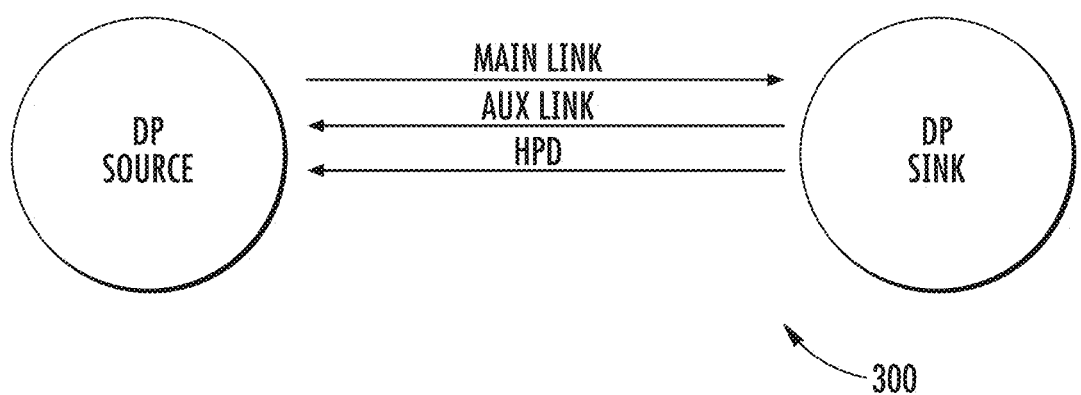
FIG. 3 is a graphical representation of one exemplary DisplayPort interface.

Referring now to FIG. 3, the exemplary DisplayPort interface comprises: a main link which may consist of one (1), two (2) or four (4) unidirectional differential signaling pairs (or "lanes"), an auxiliary link is a half-duplex bi-directional signaling link used for link management and device control, and a hot-plug detect (HPD). All signaling pairs carry data, there is no dedicated clock signaling (the receiver must recover the clock from the transmitted data). Each data lane uses 8B/10B encoding.

While TMDS could be considered a form of 8B/10B encoding, it is appreciated that as used within the relevant arts, the term "8B/10B" refers to a specific protocol developed by IBM (the IBM 8B/10B scheme was subject to patents which have since expired). DisplayPort utilizes the IBM 8B/10B encoding (as described within "A DC Balanced, Partitioned-Block, 8B/10B Transmission Code" to Widmer and Franaszek, incorporated herein by reference in its entirety). 8B/10B encoding maps an 8-bit data byte or one of a set of twelve control symbols to a 10-bit symbol in order to achieve the DC balance. The mapping is such that the mapped versions of the control symbols and data symbols are distinct. The 8-bit symbol can either be an 8-bit data byte or a control symbol. In both cases, they are mapped into 10-bit symbols. One particularly useful property of 8B/10B encoded symbols is that in any sequence of 10-bit symbols, there will never be more than a disparity of +1 or −1 when counting the number of ones and zeros (at symbol boundaries). For example, if after a number of 10-bit symbols the running disparity is −1, then the next symbol will either have exactly five (5) ones and five (5) zeros (i.e., the running disparity remains −1), or it will have six (6) ones and four (4) zeros (i.e., the running disparity changes to +1). Since the running disparity is only used at symbol boundaries, the bit-wise running disparity can range between +3 and −3.

As the scheme name suggests, eight (8) bits of data are encoded and transmitted as a 10-bit symbol. The low five (5) bits of data are encoded into a 6-bit group (i.e. the so-called 5b/6b portion) and the top three (3) bits are encoded into a 4-bit group (i.e. the so-called 3b/4b portion). These two sub-encoding groups are subsequently concatenated together to form the 10-bit symbol that is transmitted over the transmission medium. The data symbols are often referred to in the format "D.x.y" where x ranges in value from 0-31 ($2^5$=32) and y ranges in value from 0-7 ($2^3$=8), i.e. the five (5) and three (3) bit portions.

One useful property of such an encoding scheme is that since 10-bit symbols are utilized to encode 8-bit words, some of the possible one-thousand twenty-four ($2^{10}$=1024) codes can be excluded in order to comply with the previously mentioned run-length limit of five (5) consecutive equal bits and a differential limit such that the difference of the count of 0s and 1s is no more than two (2) for a given twenty bit string of bits. In addition, some of the two-hundred fifty-six (256) possible 8-bit words can be encoded in two alternative ways. Using these alternative encodings, the scheme is able to affect long-term DC-balance on the transmission line.

This DC-balance is accomplished in part via a mechanism known as "running disparity" that keeps the number of 1s and 0s that are transmitted roughly equal. That is, for each 5b/6b and 3b/4b code with an unequal number of 1s and 0s, there are two (2) bit patterns that can be used to transmit it. For example, a first ten-bit with two more 1s then 0s can be represented as follows: 001011 1110. This first ten-bit pattern can also be represented by its inverse, thereby encoding two or more 0s than 1s as follows: 110100 0001. Accordingly, depending on the current running disparity of the signal, the encoding hardware selects which of the two possible 10-bit sequences to send for the given data.

In addition, 8B/10B encoding possesses what are known as a "special symbols". They are typically referred to in the form "K.x.y" and have different encodings from any of the possible "D.x.y" symbols; i.e., they are symbols which cannot result via the encoding of an 8-bit data symbol. Table 1 below illustrates the format for these special symbols, which include a first 10-bit code for a running disparity of negative one (−1), along with its inverse for a running disparity of positive one (+1):

TABLE 1

| 8B/10B Special Symbols | | | |
|---|---|---|---|
| Input - Special Symbols | | RD = −1 | RD = +1 |
| K-Codes | HGF EDCBA | abcdei fghj | abcdei fghj |
| K.28.0 | 000 11100 | 001111 0100 | 110000 1011 |
| K.28.1 | 001 11100 | 001111 1001 | 110000 0110 |
| K.28.2 | 010 11100 | 001111 0101 | 110000 1010 |
| K.28.3 | 011 11100 | 001111 0011 | 110000 1100 |
| K.28.4 | 100 11100 | 001111 0010 | 110000 1101 |

TABLE 1-continued

| 8B/10B Special Symbols | | | |
|---|---|---|---|
| Input - Special Symbols | | RD = −1 | RD = +1 |
| K-Codes | HGF EDCBA | abcdei fghj | abcdei fghj |
| K.28.5 | 101 11100 | 001111 1010 | 110000 0101 |
| K.28.6 | 110 11100 | 001111 0110 | 110000 1001 |
| K.28.7 | 111 11100 | 001111 1000 | 110000 0111 |
| K.23.7 | 111 10111 | 111010 1000 | 000101 0111 |
| K.27.7 | 111 11011 | 110110 1000 | 001001 0111 |
| K.29.7 | 111 11101 | 101110 1000 | 010001 0111 |
| K.30.7 | 111 11110 | 011110 1000 | 100001 0111 |

These special symbols are inserted into the data stream and accordingly, can be used for executing low-level control functions separate and apart from encoded data symbols. For example, the DisplayPort specification sets forth a number of control functions that can be mapped onto these so-called "K-codes" of the IBM 8B/10B encoder specification. These control functions include: (1) Blanking Start (BS); (2) Blanking End (BE); (3) Fill Start (FS); (4) Fill End (FE); (5) Secondary-data Start (SS); (6) Secondary-data End (SE); (7) Scrambler Reset (SR); (8) Content Protection BS (CPBS); and (9) Content Protection SR (CPSR).

Referring back to FIG. 3, each data lane is scrambled with the eight (8) most significant bits of a 16-bit LFSR in reverse bit order. The characteristic polynomial for this 16-bit internal LFSR is set forth below at Equation (1).

$$G(X)=X16+X5+X4+X3+1 \qquad \text{(Equation 1)}$$

The resulting data can be represented by Equation (2).

$$D'[7:0]=D[7:0] \text{XOR LFSR}[8:15] \qquad \text{(Equation 1)}$$

Additionally, DisplayPort specifies certain rules for scrambler operation. The scrambling/descrambling LFSR advances on all symbols (both D and K), however some usages of the K symbols are not scrambled (DisplayPort versions 1.2 introduced "multistream" operation which scrambles certain K symbols). Data symbols (including null or "fill" data) is scrambled). Furthermore, certain special symbols can be used to reset the scrambling/descrambling LFSR. DisplayPort implements inter-lane skew on the data (each successive lane is offset from its predecessor by two (2) symbols), thus the data is scrambled first and the lane-to-lane skew is applied.

Apparatus—

Various embodiments of the present disclosure are directed to distinctly scrambling each lane of a multi-lane transceiver. Ideally (but not mandatorily), each lane is scrambled so as to produce uncorrelated outputs (as compared to the other scrambled lanes). Unlike correlated scrambling which results in EMI that constructively interferes (i.e., a direct sum), uncorrelated scrambling will result in EMI that adds according to a root mean square (which significantly improves overall EMI emissions). For example, with two (2) lanes, the overall EMI will be approximately 1.414 times (square root of two (2)) a single lane EMI.

LFSRs are advantageously used in exemplary implementations of the disclosure because the operation of the LFSR is deterministic, while also providing a sequence of bits that appears random. Accordingly, and as discussed previously herein, synchronization between transmitter and receiver can be maintained if the cycles between the LFSR at the transmitter and the LFSR at the receiver remains synchronized. In an exemplary embodiment, each LFSR is a 16-bit LFSR, although it is appreciated that other LFSR's (including those of other lengths, and/or tap configurations) could readily be substituted such as those described previously herein. When using an exemplary 16-bit LFSR, a subset of bits is used for symbol encoding.

Several distinct constructions are provided to illustrate the foregoing; however, those of ordinary skill in the related arts will readily appreciate that virtually any such scheme that results in uncorrelated scrambling for each lane of a multi-lane transceiver will result in reduced EMI emissions.

Figure 4A:
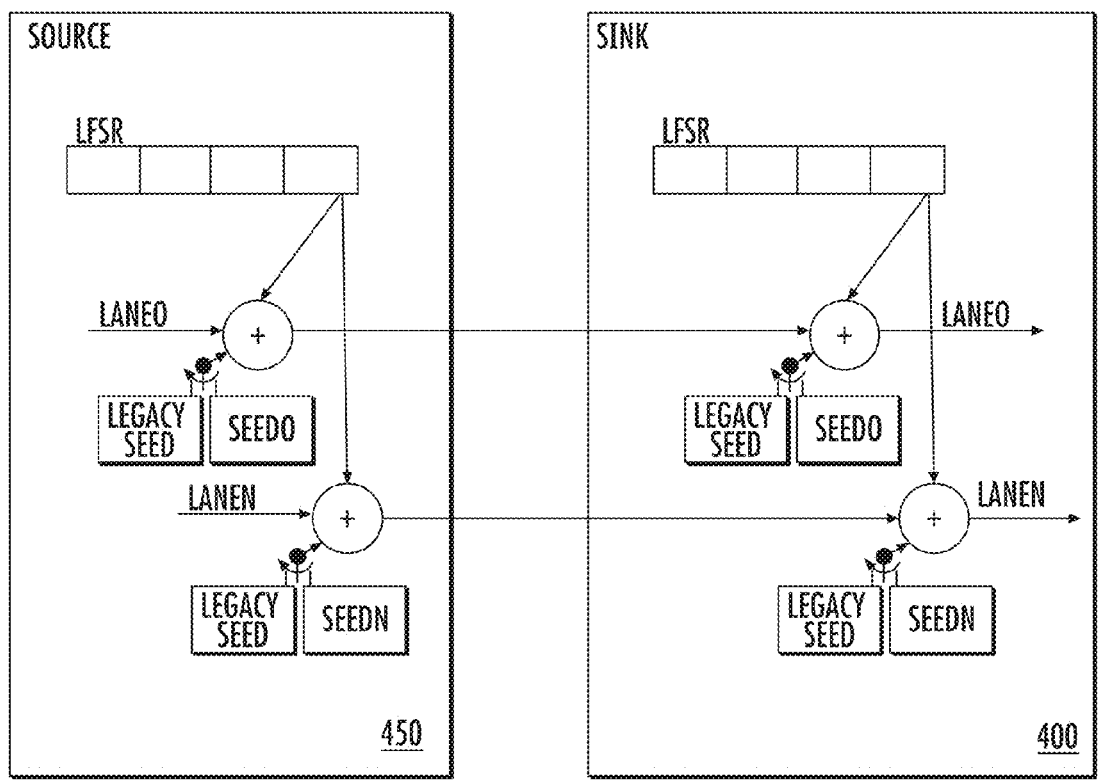
FIG. 4A is a graphical representation of an exemplary embodiment of a receiver and transmitter configured to scramble symbols according to a seeded value in order to improve undesired electromagnetic emissions, in accordance with the present disclosure.

Referring now to FIG. 4A, an exemplary embodiment of a receiver 400 and transmitter 450 configured to scramble symbols according to a seeded value in order to improve undesired electromagnetic emissions is illustrated. The circuit illustrated in FIG. 4A is shown implemented in hardware; although it is appreciated that the logic illustrated in FIG. 4A could readily be implemented in software, or combinations of hardware and software, as well.

The receiver 400 and transmitter 450 include complementary LFSRs 402 which are used for each lane but each lane is further modified uniquely by a seed value. For example, in a first variant, the data is XOR'd (exclusively OR'd) with an LFSR and then is further XOR'd with the lane (or channel number) that it is associated with for transport. In a similar variant, a pre-agreed scrambler reset seed is associated with the lane, so that when scrambler reset occurs, the LFSRs on different lanes are set to different values. It should be further noted that these two (2) variants are not exclusive, in fact a different scrambler reset can be used for each lane as well as an XOR with the lane number. While both of the foregoing examples use seed values that are based on the lane, it is readily appreciated that virtually any seed value may be used.

Other examples of seed values may include e.g., randomly generated seed values, incrementing seed values, configurable seed values, etc. In systems where the seed is dynamically set (not an agreed upon value), the receiver and transmitter may be required to negotiate or coordinate operation based on e.g., out of band signaling, an initial exchange (e.g., via non-scrambled transactions, etc.).

Figure 4B:
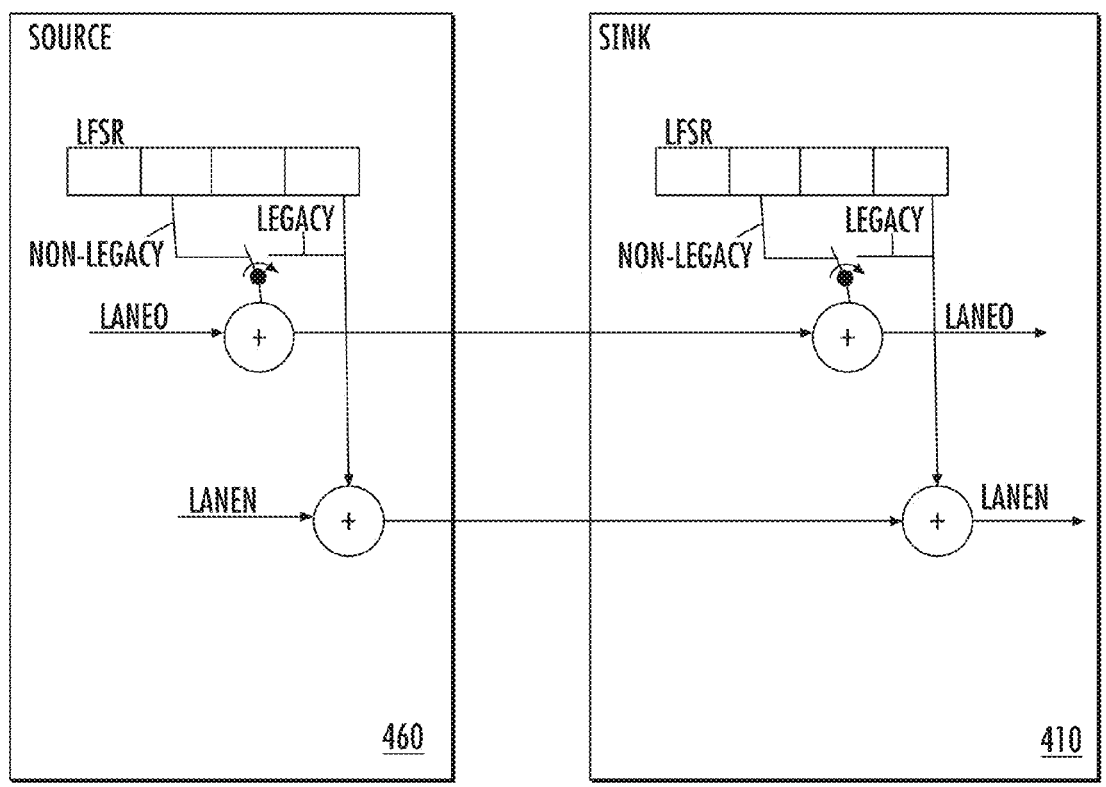
FIG. 4B is a graphical representation of an exemplary embodiment of a receiver and transmitter configured to scramble each lane with different bits of an LFSR in order to improve undesired electromagnetic emissions, in accordance with the present disclosure.

Referring now to FIG. 4B, an exemplary embodiment of a receiver 410 and transmitter 460 configured to scramble each lane with different bits of an LFSR in order to improve undesired electromagnetic emissions is illustrated.

In this example, the transmitter 460 and receiver 410 have matching LFSR bits XOR'd with the appropriate lanes. For example, as shown the first lane may use LFSR [8:15], the second lane may use LFSR[7:0], the third lane may use LFSR[0:3 . . . 8:11], and the fourth lane may use LFSR[15: 12 . . . 7:4], etc. In other examples, a 32-bit LFSR can be used such that: the first lane uses [0:7], the second lane uses [8:15], the third lane uses 16:23], and the fourth lane uses [23:31]. Those of ordinary skill will recognize that the foregoing selection of bits is merely illustrative of the myriad of combinations that are possible.

Figure 4C:
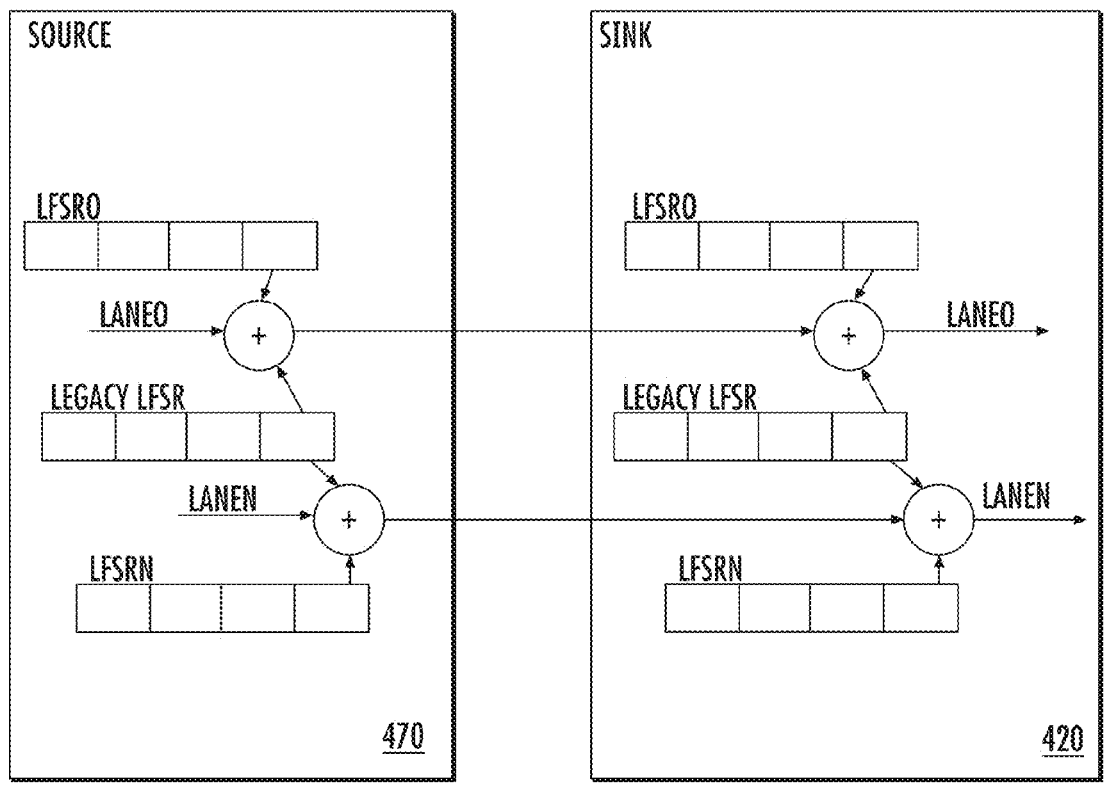
FIG. 4C is a graphical representation of an exemplary embodiment of a receiver and transmitter configured to scramble each lane with a different LFSR in order to improve undesired electromagnetic emissions, in accordance with the present disclosure.

Referring now to FIG. 4C, an exemplary embodiment of a receiver 420 and transmitter 470 configured to scramble each lane with a different LFSR in order to improve undesired electromagnetic emissions is illustrated.

As shown each lane is associated with a distinct LFSR. Those of ordinary skill in the related arts will recognize that significant research has been devoted to discovering LFSRs with desirable properties e.g., maximal length, self-synchronization, maximal run length, etc. Accordingly variants may select LFSRs based on any of such desirable properties. For example certain applications may be more interested in self-synchronizing LFSRs than LFSRs which have guarantee shorter maximal run lengths or vice versa.

Moreover, it is further appreciated that in some circumstances, it may be desirable to combine one or more of the foregoing schemes of FIGS. 4A-C. For example, in some embodiments, each lane may be seeded with a different initial value and additionally use unique bits of the LFSR.

Still further, it is appreciated that since both the transmitter and receiver must agree on the multi-lane scrambling scheme, various systems may be configured to negotiate the multi-lane scrambling configuration and/or default to a specific configuration. In some variants, the default configuration is compatible with legacy systems.

Figure 5:
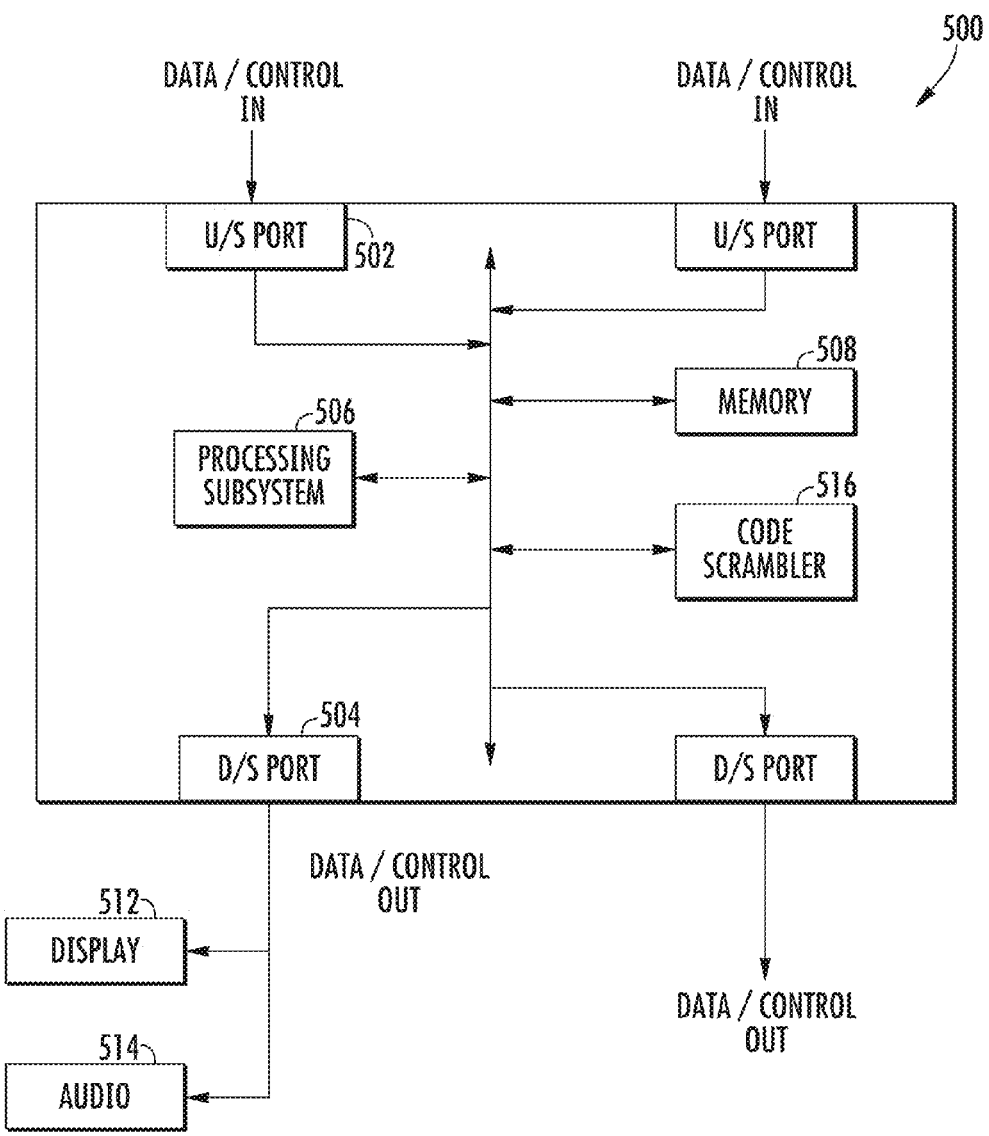
FIG. 5 is a logical block diagram of an exemplary embodiment of a user device (apparatus) having multi-lane symbol encoding/decoding capability.

Referring now to FIG. 5, an exemplary embodiment of a user device (apparatus) 500 having multi-lane symbol encoding/decoding capability is illustrated. As used herein, the term "user device" includes but is not limited to cellular telephones, smartphones (such as for example an iPhone™ manufactured by the Assignee hereof), personal computers (PCs), such as for example an iMac™, Mac Pro™, Mac Mini™, MacBook™, MacBook Pro™ MacBook Air™, and minicomputers, whether desktop, laptop, or otherwise, as well as mobile devices such as handheld computers, PDAs, video cameras, set-top boxes, personal media devices (PMDs), such as for example an iPod™, tablets or phablets, such as e.g., the iPad™, display devices (e.g., those compliant with the aforementioned HDMI standard(s)), or any combinations of the foregoing.

While a specific device configuration and layout is shown and discussed, it is recognized that many other configurations may be readily implemented by one of ordinary skill given the present disclosure, the apparatus 500 of FIG. 5 being merely illustrative of the broader principles of the disclosure. For example, it is appreciated that the device illustrated in FIG. 5 could readily be implemented as either a source or alternatively as a sink, or in fact could be configured to operate as both. Appropriate modifications to the layout shown would be readily apparent to one of ordinary skill given the present disclosure.

The illustrated apparatus 500 of FIG. 5 includes an upstream plurality of ports and corresponding receiving elements (e.g., receiver or transceiver network interfaces) 502, a downstream plurality of ports and corresponding transmitting elements (transmitting interfaces or transceivers) 504. As used herein, the terms "network interface" or "interface" typically refer to any signal, data, or software interface with a component, network or process including for example and without limitation those of the HDMI, FireWire (e.g., FW400, FW800, etc.), USB (e.g., USB2, USB 2.0, USB 3.0, wireless USB), Ethernet (e.g., 10/100, 10/100/1000 (Gigabit Ethernet), 10-Gig-E, etc.), Thunderbolt, or wireless varieties.

The upstream plurality of ports and associated receiving elements 502 may comprise one or more upstream auxiliary channels, one or more upstream media ports, and receiver apparatus (e.g., multiplexing switches, reception logic, clock recovery circuitry, etc.). In one exemplary embodiment, the auxiliary channel is bi-directional and carries management and device control data, and the upstream media ports minimally comprise receivers for unidirectional data lanes, and use of an embedded clock. The receiver apparatus monitors and selectively enables and disables the auxiliary and media ports. In certain embodiments, the receiver apparatus may be adapted to utilize a packet-based unidirectional network protocol, such as the DisplayPort or HDMI protocol previously described herein.

Similarly, the downstream plurality of ports and associated receiving elements 504 comprise one or more downstream auxiliary channels, one or more downstream media ports, and transmitter apparatus (e.g. demultiplexing switches, transmission logic, clock embedding circuitry, etc.). In one exemplary embodiment, the auxiliary channel is bi-directional and carries management and device control data, and the downstream media ports minimally comprise transmitters for unidirectional data lanes, and inclusion of an embedded clock. The transmitter apparatus monitors and selectively enables and disables the auxiliary and media ports. As with the receiver, the transmitter apparatus may be adapted to utilize a packet-based unidirectional network protocol.

In an exemplary implementation, the downstream-facing ports may include a serializer adapted to receive an input word and output a bit stream. For example, in one configuration, the serializer may receive a 10-bit input word and output ten (10) serial bits. In addition, the serializer may also provide an optional corresponding clock.

Conversely, in another configuration, the upstream-facing ports may also include a de-serializer adapted to receive a serial bit stream and output a word. Furthermore, such de-serializing apparatus may additionally require clock recovery circuitry and boundary detection, as is well understood in the digital computing arts. For example, in one embodiment, the de-serializer may receive 10 (ten) serial bits, and convert it into one 10-bit word. When the de-serializer detects a misalignment of timing by one or more bits, the de-serializer accordingly skips or pads its rate accordingly. Furthermore, during initialization, the de-serializer may recognize an initiation sequence.

Also included are one or more storage devices (e.g., a memory subsystem) 510 used to store for example data for transmission or that has been received.

It will be appreciated that not all elements are required in a single device for operation within a "network". For instance, a device only capable of "source" operation would not require upstream ports, or certain audio or video elements. Conversely, a "sink" device may not require downstream ports. Moreover, the "receiver" 502 and "transmitter" 504 elements may comprise transceivers capable of both transmission and reception if desired.

Note that as used herein, such network may be comprised of (without limitation) as few as two devices in communication with one another via an interface, or even two components in communication with one another within the same host apparatus.

The processing subsystem 506 may comprise one or more of central processing units (CPU) or digital processors, such as a microprocessor, digital signal processor, field-programmable gate array, RISC core, or plurality of processing components mounted on one or more substrates.

The processing subsystem is coupled to memory subsystem 510, which may include for example SRAM, FLASH and SDRAM components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

The processing subsystem may also comprise additional co-processors, such as a dedicated graphics accelerator, network processor (NP), or audio/video processor. As shown processing subsystem 806 includes discrete components, however it is understood that in some embodiments they may be consolidated or fashioned in a SoC (system-on-chip) configuration.

The processing subsystem 506 is adapted to receive one or more media streams from an upstream apparatus 502 for processing for media displays such as a video display 512, or audio speakers 514. Processing subsystem 506 may preferentially comprise graphics processors, applications processors, and or audio processors. In "thin clients", the processing subsystem 506 may be significantly reduced in complexity and limited to simple logic, or in extreme cases altogether non-existent.

It will be readily appreciated by those of ordinary skill that different combinations and/or variations of the foregoing can be made depending on the desired application and performance attributes.

Methods—

Figure 6:
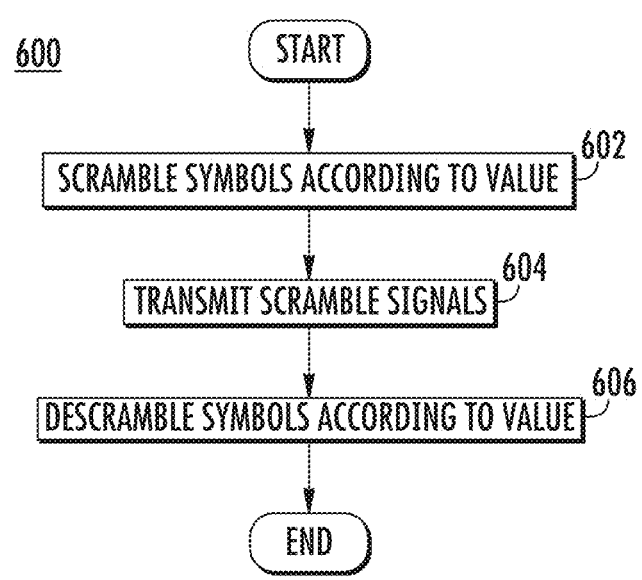
FIG. 6 is a logical flow diagram representing one embodiment of a generalized method for scrambling symbols over multi-lane serial interfaces.

Referring now to FIG. 6, one generalized embodiment of a method 600 for scrambling symbols over multi-lane serial interfaces is disclosed.

At step 602 of the method 600, a plurality of symbols are scrambled according to at least a corresponding plurality of scrambling values.

In one variant, the scrambling is based on a seed value. The seed value may be fixed or variable. For example, the seed value may be the lane number associated with the symbol. In other embodiments, the seed value may be set according to a pre-determined scheme (e.g., based on time, application, incrementing count, etc.). In certain scenarios, the seed value may be communicated, negotiated, or otherwise actively agreed upon between the transmitter and the receiver.

In another variant, the scrambling values are selected from various taps of a scrambling component. For example, the scrambling values may be any arrangement of bits, nibbles, bytes, word, etc. of an LFSR output. Moreover, the taps may be selected contiguously, non-contiguously, little endian, big endian, etc.

In still another variant, the scrambling values are selected from different scrambling components. For example, the receiver and transmitter may have an array of LFSRs which are assigned to individual lanes, etc.

In some embodiments, the scrambling component is a linear feedback shift register (LFSR). In other embodiments, the scrambling component is a memory with an appropriately randomized sequence of values. In still other embodiments, the scrambling component is an algorithm implemented within software.

Various LFSRs may be used according to design requirements. In some variants, the LFSR is a maximal length LFSR. Alternately, the LFSR may be a self-synchronizing LFSR. In still other scenarios, the LFSR may guarantee a maximum run length.

At step 604 of the method 600, the plurality of scrambled symbols are transmitted via a corresponding plurality of lanes to a receiver.

At step 606 of the method 600, the plurality of received scrambled symbols are descrambled. Descrambling is performed in the exemplary embodiment with an appropriately complementary descrambler.

It will be recognized that while certain aspects of the disclosure are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claims herein.

While the above detailed description has shown, described, and pointed out novel features of the disclosure as applied to various embodiments, it will be understood that various omissions, substitutions, and changes in the form and details of the device or process illustrated may be made by those skilled in the art. The foregoing description is of the best mode presently contemplated. This description is in no way meant to be limiting, but rather should be taken as illustrative of the general principles, and the scope of the various aspects of the disclosure should be determined with reference to the claims.

What is claimed is:

1. An apparatus configured to scramble a plurality of symbols, comprising:
a first interface that comprises a plurality of lanes, wherein in a legacy mode each lane is characterized by a common encoding mechanism configured to encode one or more symbols based on a running disparity, and in a non-legacy mode each lane is configured to scramble one or more symbols based on a corresponding distinct linear feedback shift register (LFSR) mechanism;
a processor in data communication with the first interface and configured to:
when in the non-legacy mode:
transmit a plurality of symbols via the plurality of lanes, where the plurality of symbols are scrambled according to the corresponding distinct LFSR mechanism associated with each lane;
wherein the plurality of symbols are configured to be descrambled by a receiver, responsive to reception of the plurality of symbols; and
when in the legacy mode:
transmit another plurality of symbols compatible with legacy systems via the plurality of lanes, where the another plurality of symbols are encoded according to the common encoding mechanism;
wherein the another plurality of symbols are configured to be decoded by the receiver based on the running disparity, responsive to reception of the another plurality of symbols.

2. The apparatus of claim 1, wherein each corresponding distinct LFSR mechanism is based on a seed that corresponds to each lane, and the common encoding mechanism comprises an 8B10B line code.

3. The apparatus of claim 2, wherein each seed that corresponds to each of the corresponding distinct LFSR mechanisms results in a different initial value.

4. The apparatus of claim 2, wherein the plurality of symbols are scrambled with different bits of its corresponding distinct LFSR mechanism, based on a given lane of the plurality of lanes.

5. The apparatus of claim 3, wherein each corresponding distinct LFSR mechanism comprises a self-synchronizing LFSR.

6. The apparatus of claim 5, wherein the self-synchronizing LFSR is configured to reset when a pre-agreed scrambler reset seed is sent or received.

7. The apparatus of claim 1, wherein the processor in data communication with the first interface is further configured to negotiate whether to operate according to the non-legacy mode or the legacy mode with the receiver.

8. The apparatus of claim 7, wherein the negotiation defaults to the legacy mode.

9. A method for scrambling a plurality of symbols, comprising:
determining whether to operate in a non-legacy mode or a legacy mode;
when operating in the non-legacy mode:
scrambling a plurality of symbols via each lane of a plurality of lanes, each lane operating according to a corresponding distinct linear feedback shift register (LFSR) mechanism; and
transmitting the plurality of symbols via the plurality of lanes;
wherein the plurality of symbols are configured to be descrambled by a receiver, responsive to reception of the plurality of symbols; and
when operating in the legacy mode:
encoding another plurality of symbols via the plurality of lanes according to a common encoding scheme based on a running disparity;
transmitting the another plurality of symbols via the plurality of lanes;
wherein the another plurality of symbols are configured to be decoded by the receiver based on the running disparity, responsive to reception of the another plurality of symbols.

10. The method of claim 9, wherein the scrambling of the plurality of symbols is based on a seed associated with each lane, and the common encoding scheme comprises an 8B10B line code.

11. The method of claim 10, further comprising initializing each corresponding distinct LFSR mechanism with a different initial value based on the seed that corresponds to each lane.

12. The method of claim 11, wherein the initializing of each corresponding distinct LFSR mechanism is performed responsive to sending or receiving a pre-agreed scrambler reset seed.

13. The method of claim 10, wherein the scrambling of the plurality of symbols is based on different bits of the LFSR mechanism used in each lane.

14. A method of scrambling a plurality of symbols, comprising:
determining whether to operate in a non-legacy mode or to default to operation in a legacy mode;
when operating in the non-legacy mode:
scrambling a plurality of symbols via each lane of a plurality of lanes according to an uncorrelated scrambling mechanism; and
transmitting the plurality of symbols via the plurality of lanes;
wherein the plurality of symbols are configured to be descrambled by a receiver, responsive to reception of the plurality of symbols; and
otherwise, when operating in the legacy mode:
scrambling another plurality of symbols via a correlated scrambling mechanism;
wherein the another plurality of symbols are configured to be descrambled by the receiver, responsive to reception of the another plurality of symbols.

15. The method of claim 14, wherein the scrambling of the plurality of symbols according to the uncorrelated scrambling mechanism comprises scrambling each lane of the plurality of lanes with a different seed; and the scrambling of the another plurality of symbols via the correlated scrambling mechanism comprises scrambling each lane of the plurality of lanes with a common seed.

16. The method of claim 14, further comprising encoding the plurality of symbols according to an 8B10B line coding scheme or encoding the another plurality of symbols according to the 8B10B line coding scheme.

17. The method of claim 14, further comprising, when operating in the non-legacy mode, initializing at least one self-synchronizing linear feedback shift register (LFSR).

18. The method of claim 14, wherein the determining of whether to operate in the non-legacy mode comprises executing a non-scrambled transaction.

19. The method of claim 14, wherein the determining of whether to operate in the non-legacy mode comprises executing an out-of-band transaction.

* * * * *